United States Patent [19]

Naito et al.

[11] B 3,923,783

[45] Dec. 2, 1975

[54] 5''-AMINO-4',5''-DIDEOXYAMBUTYROSIN

[75] Inventors: Takayuki Naito; Susumu Nakagawa, both of Tokyo; Soichiro Toda, Koshigaya, all of Japan

[73] Assignee: Bristol-Myers Company, New York, N.Y.

[22] Filed: June 15, 1973

[21] Appl. No.: 371,085

[44] Published under the Trial Voluntary Protest Program on January 28, 1975 as document no. B 371,085.

[52] U.S. Cl. ........ 260/210 AB; 195/31; 260/210 R; 424/180; 424/181
[51] Int. Cl.² ........................................ C07H 15/22

[58] Field of Search ................ 260/210 AB, 210 R

[56] References Cited
UNITED STATES PATENTS

| | | | |
|---|---|---|---|
| 3,784,541 | 1/1974 | Culbertson et al. | 260/210 AB |
| 3,792,037 | 2/1974 | Kawaguchi et al. | 260/210 AB |

*Primary Examiner*—Johnnie R. Brown
*Attorney, Agent, or Firm*—Robert E. Havranek

[57] ABSTRACT

Derivatives of ambutyrosin A and 4'-deoxyambutyrosin A have been prepared which possess substantially improved antibacterial activity. An example of such an agent is 5''-amino-5''-deoxyambutyrosin A.

5 Claims, No Drawings

5''-AMINO-4',5''-DIDEOXYAMBUTYROSIN

BACKGROUND OF THE INVENTION

1. Field of the Invention

This invention relates to a semisynthetic derivative of ambutyrosin A or 4'-deoxyambutyrosin A, said compound being prepared by converting the 5''-hydroxy function to a 5''-amino function.

2. Description of the Prior Art

Ambutyrosin A is the subject matter of U.S. Pat. No. 3,541,078 and has the formula

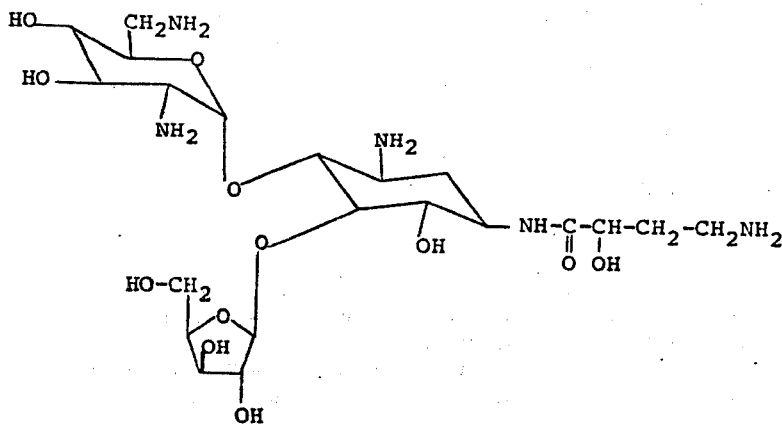

4'-Deoxyambutyrosin A has the formula

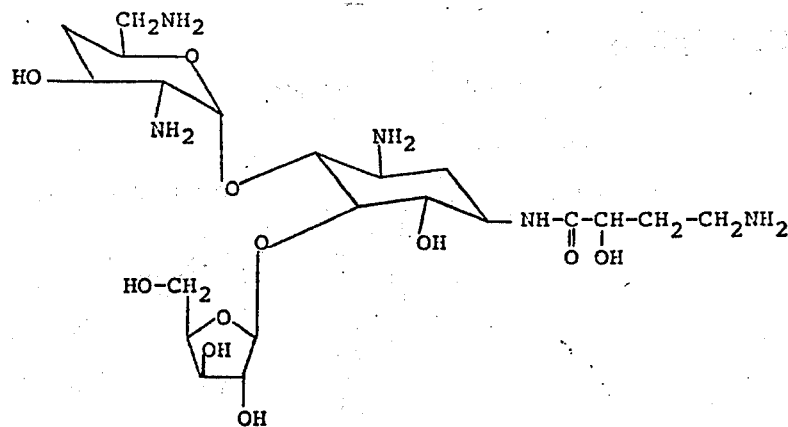

and is described in the co-pending application of our associates, Ser. No. 288,623, filed Sept. 13, 1972.

SUMMARY OF THE INVENTION

The compounds having the formula

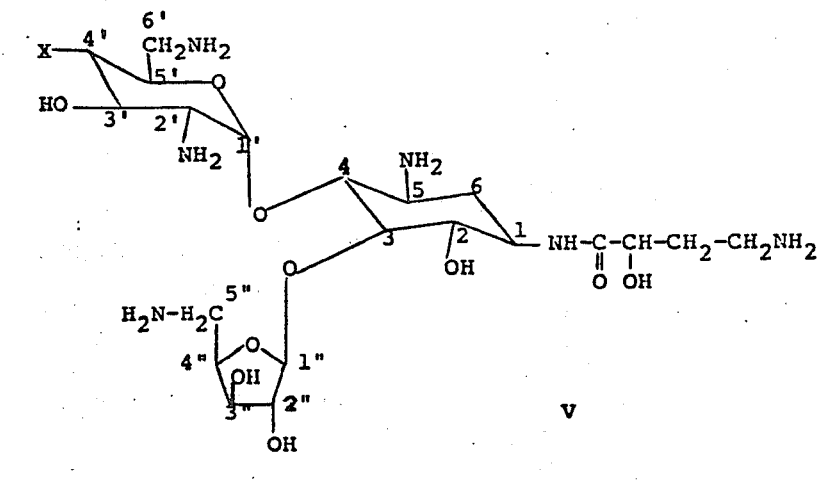

in which X is H or OH; or a pharmaceutically acceptable acid addition salt thereof are valuable antibacterial agents.

COMPLETE DISCLOSURE

This invention relates to semi-synthetic derivatives of ambutyrosin A or 4'-deoxyambutyrosin A, said compounds being known as 5''-amino-5''-deoxyambutyrosin A (Va, BB-K 126) and 5''-amino-4',5''-dideoxyambutyrosin A (Vb, BB-K 137) and respectively having the formulas 1–5 moles of a nontoxic, pharmaceutically acceptable acid. Included among these acids are acetic, hydrochloric, sulfuric, maleic, phosphoric, nitric, hydrobromic, ascorbic, malic and citric acid, and those other acids commonly used to make salts of amine containing pharmaceuticals.

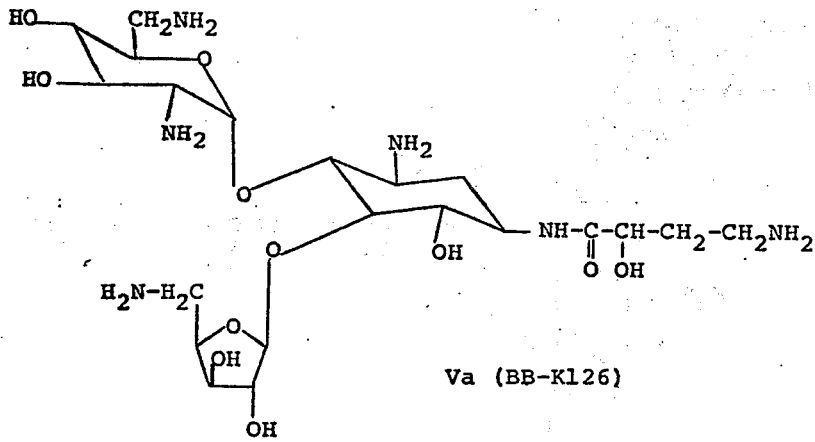

Va (BB-K126)

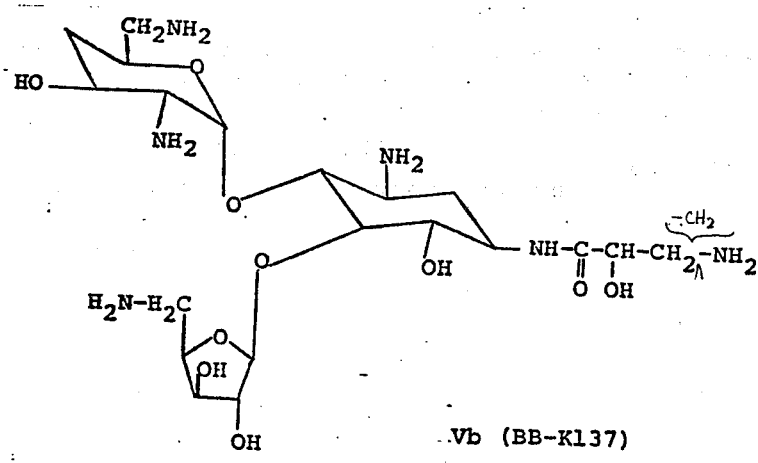

Vb (BB-K137)

For the purpose of this disclosure, the term "nontoxic pharmaceutically acceptable acid addition salt" shall mean a mono, di-, tri-, tetra or pentasalt formed by the interaction of 1 molecule of compound V with The compounds of the present invention are prepared by the following diagramatic scheme:

1) Ambutyrosin A(Ia)
   or
   4'-Deoxyambutyrosin A(Ib)

$\xrightarrow{\text{Benzyloxycarbonyl chloride}}$

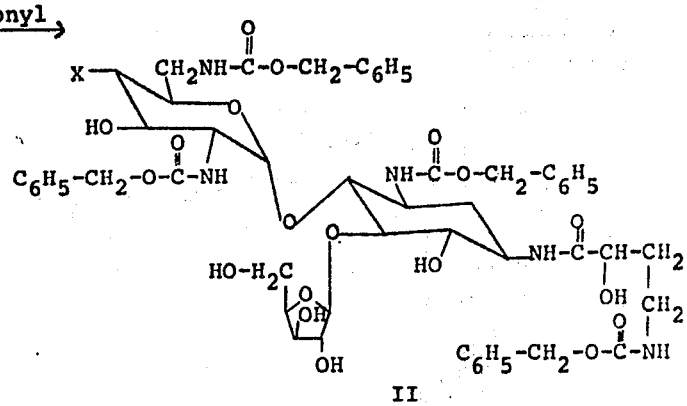

II in which X is OH(IIa) or H(IIb).

2) Compound II $\xrightarrow{\text{Tosyl chloride}}$
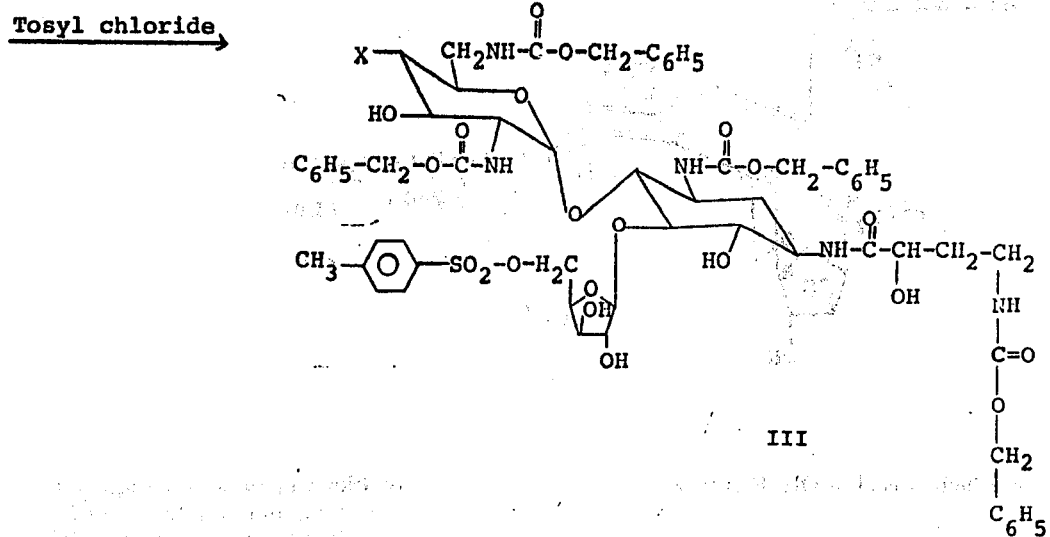
in which X is OH(IIIa) or H(IIIb).
3) Compound III $\xrightarrow{\text{NaN}_3}$
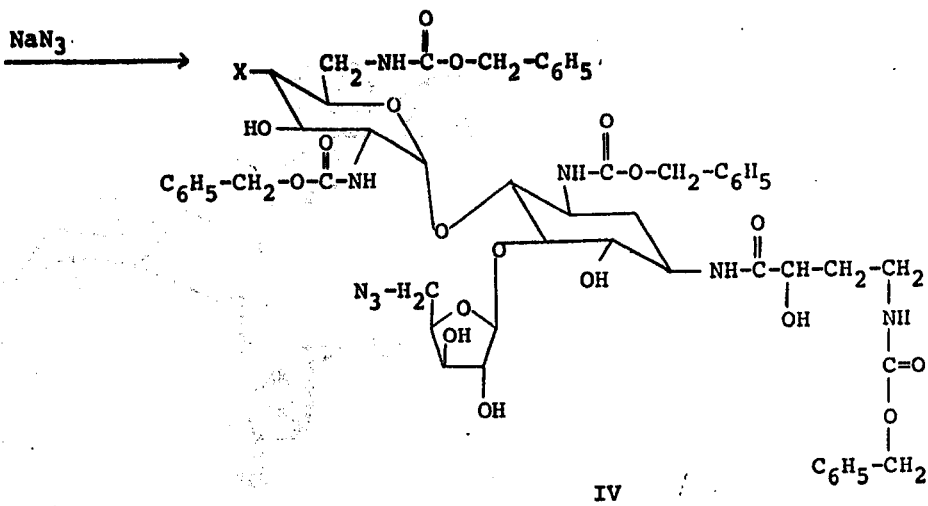
in which X is OH(IVa) or H(IVb).
4) Compound IV $\xrightarrow{\text{H}_2/\text{Pd}}$ Compound Va
or
Compound Vb
A preferred embodiment of the present invention is the compound having the formula

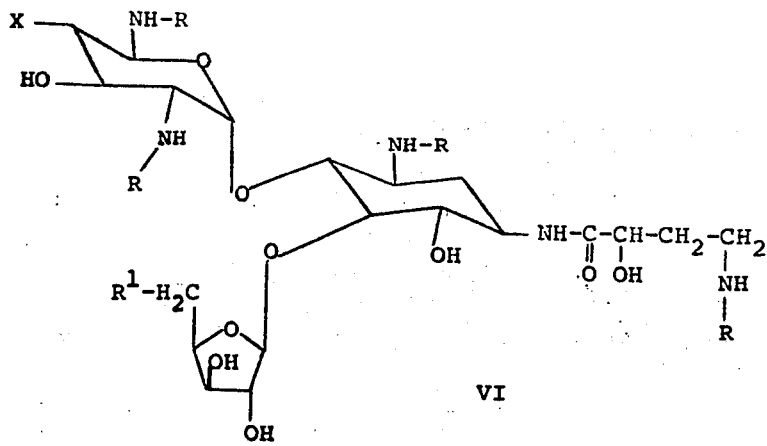

VI in which X is H or OH, R is H or

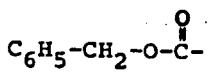

and R¹ is N₃ or NH₂; or a pharmaceutically acceptable acid addition salt thereof.

Another preferred embodiment is the compound of formula VI in which R is

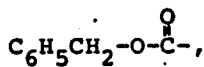

R¹ is N₃ and X is H or OH.

A more preferred embodiment is the compound of formula VI in which R is H, R¹ is NH₂ and X is H or OH; or a pharmaceutically acceptable salt thereof.

A most preferred embodiment is the compound of formula VI in which R is H, R¹ is NH₂ and X is OH; or a mono- or polysulfate salt thereof.

Another most preferred embodiment is the compound of formula VI in which R is H, R¹ is NH₂ and X is H; or a mono- or polysulfate salt thereof.

Another most preferred embodiment is the compounds of formula VI in which R is H, R¹ is NH₂ and X is H or OH; or a mono- or polyhydrate thereof.

The objectives of the present invention have been achieved, by the provision according to the present invention of the process for the preparation of the compound having the formula

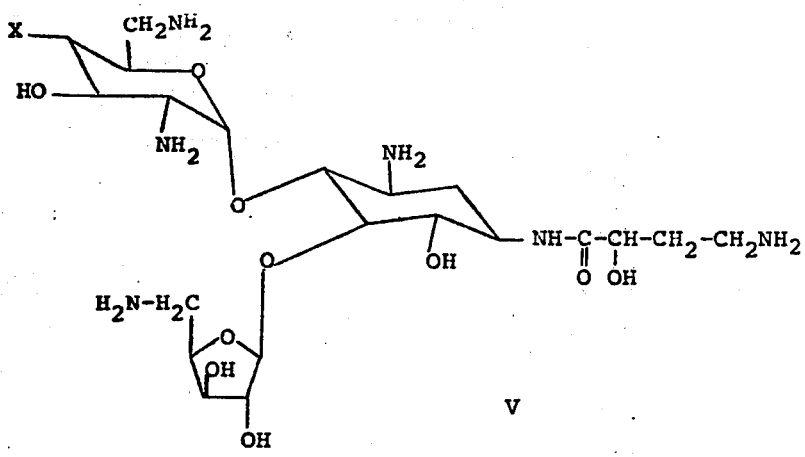

V in which X is H or OH; or a nontoxic pharmaceutically acceptable acid addition salt thereof; which process comprises the consecutive steps of A. acylating ambutyrosin A or 4'-deoxyambutyrosin A with benzyloxycarbonyl chloride, or its functional equivalent as an acylating agent, in a ratio of at least 4 moles, but preferably 4-4.5 moles, of acylating agent per mole of ambutyrosin A or 4'-deoxyambutyrosin A in solvent, preferably selected from the group comprised of dimethylformamide, dimethylacetamide, tetrahydrofuran, dioxane, 1,2-dimethoxyethane, methanol, ethanol, water, acetone, pyridine, N-(lower)alkylpiperidine, or mixtures thereof, but preferably 20% aqueous acetone, at a temperature in the range of 10°C to about 50°C, but preferably at about 25°C, to produce the compound having the formula

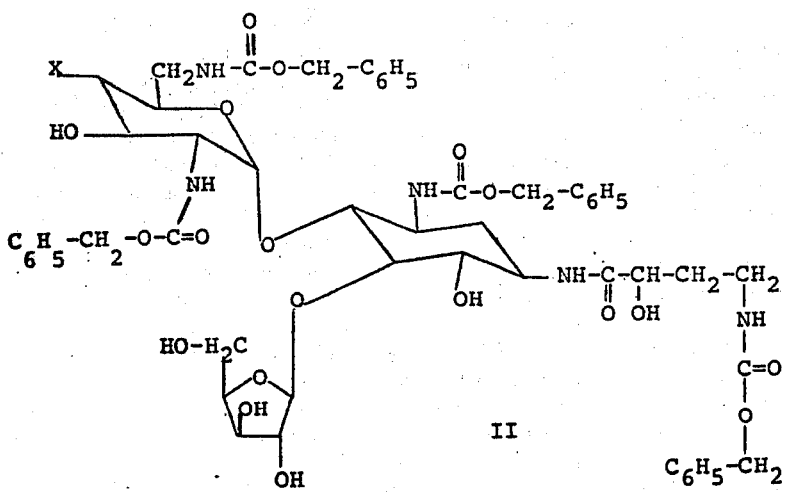

in which X is H or OH;

B. acylating compound II with a sulfonyl halide having the formula

W—SO$_2$—Z in which Z is chloro, bromo or iodo, W is (lower)alkyl or an aryl moiety of the formula

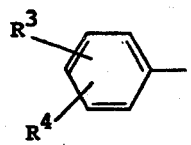

in which $R^3$ and $R^4$ are alike or different and each is H, (lower)alkyl, nitro, (lower)alkoxy, chloro, bromo, iodo and the like, in a ratio of at least one mole of sulfonyl halide, but preferably 1.0 to 1.2 moles, per mole of compound II in an inert organic solvent such as pyridine, benzene, toluene, dimethylformamide, acetone, and the like, and when the solvent is other than pyridine, in the presence of an excess amount of a tertiary amine, at a temperature in the range of −10°C to about 15°C, but preferably in the range of 0°C to 10°C, to produce the compound having the formula

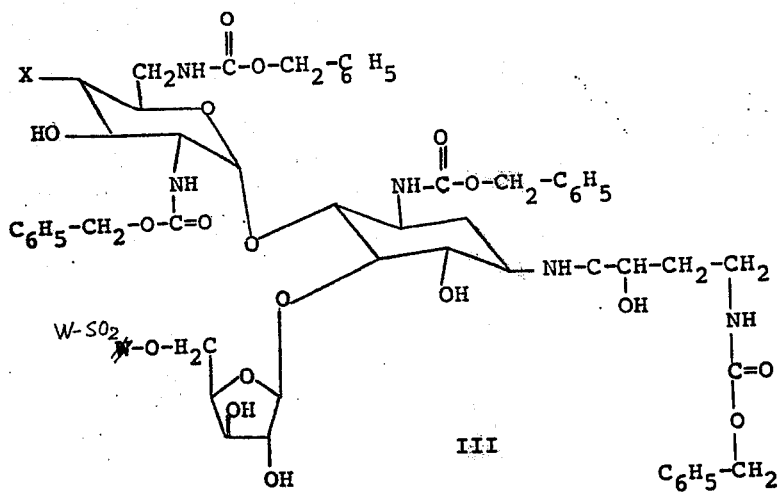

in which X and W are as defined above;

C. treating compound III with a large excess of sodium or potassium azide in an organic solvent such as acetone, dimethylformamide, dimethylacetamide and the like, in the presence of about 5–10% water, with the use of heat at about 80°–120°C for at least four hours to produce the compound having the formula

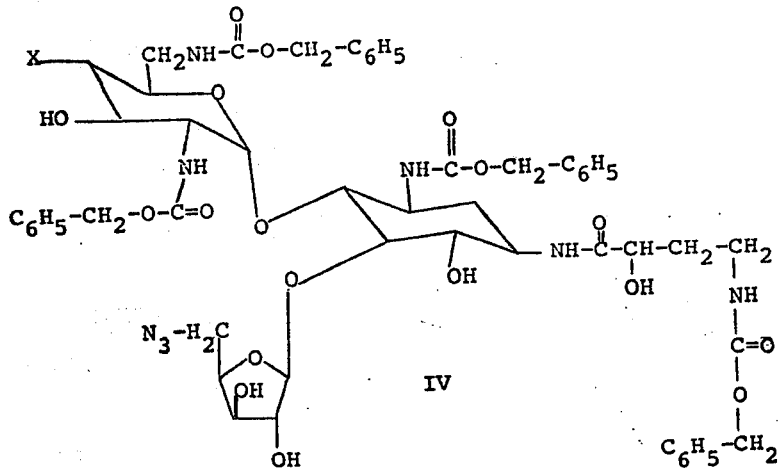

in which X is H or OH; and

D. hydrogenating compound IV with hydrogen in the presence of a metal catalyst, preferably selected from the group comprising palladium, platinum, Raney nickel, rhodium, ruthenium and nickel, but preferably palladium, and most preferably palladium on charcoal, in a water miscible solvent system, preferably selected from the group comprising water and dioxane, tetrahydrofuran, ethyleneglycol dimethyl ether, propyleneglycol dimethyl ether, or the like, but preferably 1:1 water ethanol to produce the compound of formula It should be apparent to those knowledgeable in the art that other agents can be used in the process above to acylate the amine functions of the intermediate compounds of the instant invention. This disclosure is meant to include all such acylating agents that produce labile amine blocking groups, said labile blocking groups commonly employed in the synthesis of peptides. The labile blocking groups must be readily removable by methods commonly known in the art. Examples of said labile blocking groups and their removal can be found in the review of A. Kapoor, J. Pharm. Sciences 59, pp. 1–27 (1970). Functional equivalents as acylating agent for primary amine groups would include corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester of thioester (e.g., with p-nitrophenol, 2,4-dinitrophenol, thiophenol, thioacetic acid) may be used or the free acid itself may be coupled with the ambutyrosin A derivative (I) after first reacting said free acid with N,N'-dimethylchloroforminium chloride [cf. Great Britain Pat. No. 1,008,170 and Novak and Weichet, Experientia XXI/6, 360 (1965)] or by the use of enzymes or of an N,N'-carbonyldiimidazole or an N,N'-carbonylditriazole [cf. Sheehan and Hess, J. Amer. Chem. Soc., 77, 1067, (1955)] or of alkynylamine reagent [cf. R. Buijile and H. G. Viehe, Angew, Chem., International Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of a quasiaromatic five membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The byproduct, imidazole, precipitates and may be separated and the imidazolide isolated, but this is not essential. These reactions are well-known in the art (cf. U.S. Pat. Nos. 3,079,314, 3,177,126 and 3,129,224 and British Pat. Nos. 932,644, 957,570 and 959,054).

Disclosure of the Preparation of 4'-Deoxyambutyrosin A

Antibiotic complex Bu-1975, is fermented from *Bacillus circulans* subsp. *n. croceus*, *Bacillus circulans* subsp. *n. proteophilus*, or *Bacillus circulans* subsp. *n. biotinicus*. The two novel components of the complex are 4'-deoxyambutyrosin A (Ib) having the formula

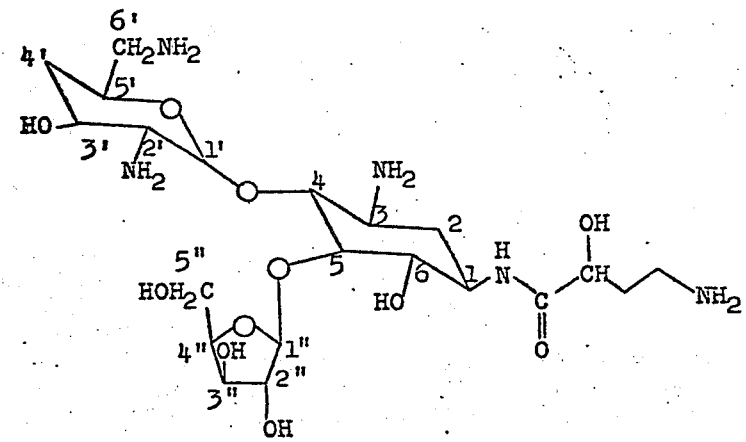

and 4'-deoxyambutyrosin B (Ic) having the formula

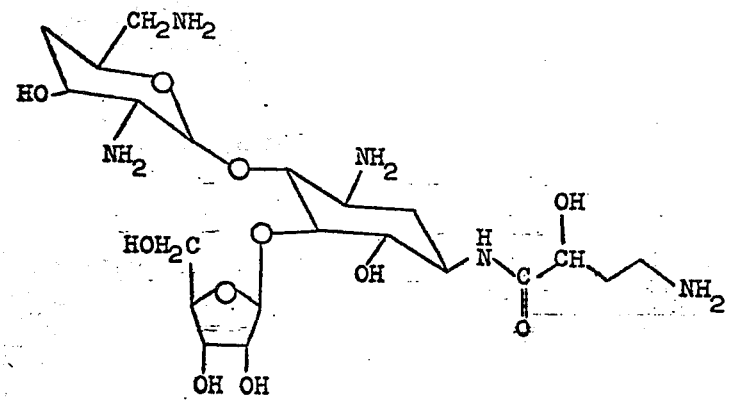

Component Ib is chemically known as $N^1$-(4-amino-2-hydroxybutyrl)-4-0-(2,6-diamino-2,4,6-trideoxy-D-glucopyranosyl)-5-O-D-xylofuranosyl-2-deoxystreptamine.

Component Ic is chemically known as $N^1$-(4-amino-2-hydroxybutyrl)-4-0-(2,6-diamino-2,4,6-trideoxy-D-glucopyranosyl)-5-O-D-ribofuranosyl-2-deoxystreptamine.

The antibiotic complex, Bu-1975, has been isolated from the fermentation broth of three strains of *Bacillus circulans*, designated as Strain Nos. C308-B4, C436-B1 and C532-B2 in the Bristol-Banyu culture collection. The antibiotic is a complex of at least five bio-active components. $A_1$, $A_2$, B, Ib and Ic. Components $A_1$ and $A_2$ were identified with ambutyrosins A and B [U.S. Pat. No. 3,541,078 and Tetrahedron Letters, 28, pp. 2625-2628 (1971)] respectively and component B was a solvent-extractable antibiotic with peptide-like properties.

Components Ib and Ic are new aminoglycoside antibiotics. Ib was found to be composed of D-xylose, 2-deoxystreptamine, L-(-)-γ-amino-α-hydroxybutyric acid and 2,6-diamino-2,4,6-trideoxy-D-glucose, a new deoxy amino sugar, and is named 4'-deoxyambutyrosin A.

Ic was found to be composed of D-ribose, 2-deoxystreptamine, L-(-)-γ-amino-α-hydroxybutyric acid and 2,6-diamino-2,4,6-trideoxy-D-glucose and hence it is 4'-deoxyambutyrosin B.

The complex is fermented from either of three subspecies of the microorganism *Bacillus circulans*.

A culture of each of the living organisms has been deposited in the American Type Culture Collection, 12301 Parklawn Drive, Rockville, Md. 20852 and have been assigned the following names and catalog numbers:

*Bacillus circulans* subsp. *n. croceus* (Strain No. C308-B4) A.T.C.C. 21820.
*Bacillus circulans* subsp. *n. proteophilus* (Strain No. C436-B1) A.T.C.C. 21821.
*Bacillus circulans* subsp. *n. biotinicus* (Strain No. C532-B2) A.T.C.C. 21822.

Antibiotic Production

A well-grown agar slant of the Bu-1975-producing organism was used to inoculate the seed medium containing 1.5% glucose, 0.5% polypeptone, 0.2% yeast extract, 0.5% $K_2HPO_4$ and 0.05% $MgSO_4.7H_2O$, the pH being adjusted to 7.5 before sterilization. The seed culture was incubated at 37°C for 24 hours on a rotary shaker (250 rpm), and 2 ml. of the growth was transferred to 100 ml. of the fermentation medium in a 500-ml. Erlenmeyer flask, which has a composition of 3% soybean meal, 2% corn starch, 1% $CaCO_3$ and 0.33% $MgSO_4.7H_2O$. Antibiotic production reached a maximum after 3–6 days shaking at 28°C.

The antibiotic activity in the fermentation broth was determined by the paper disc-agar diffusion assay using *Bacillus subtilis* PC1219 and *Klebsiella pneumoniae* A20680. All components of Bu-1975 complex ($A_1$, $A_2$, B, Ib and Ic) showed activity against *B. subtilis* PC1219 but only two components, Ib and Ic, were active against *K. pneumoniae* A20680.

The productivity of the Ib and Ic components relative to the other components were different among the strains. In the shaking flask fermentation, strain C532-B2 produced 50–100 mcg./ml. of the I components which represented about 30–50% of the total bio-activity assayed by *B. subtilis*. Other strains were less productive of the I components than strain C532-B2.

Isolation and Purification

The harvested broth was filtered using filter aid and the bio-activity in the filtrate (pH 8.0) was absorbed by a column of Amberlite IRC-50 ($NH_4^+$ form). The column was washed with water and then developed by 1 N $NH_4OH$ solution. The active eluates were combined, concentrated in vacuo and extracted with n-butanol to remove component B in the concentrate. The aqueous layer was separated and applied on a column of Amberlite CG-50 ($NH_4^+$ form). The column was washed by water and N/4 $NH_4OH$ solution successively, and the activity was eluted by N/2 $NH_4OH$, the eluate being collected fractionally. The active components were eluted in the order of $A_2$, $A_1$, Ib and Ic, though with considerable overlap of the components, and the complete separation of each component was achieved after repeating the CG-50 column chromatography.

As shown in Table 4, two TLC (thin layer chromatography) systems, S-110 and S-117 were found suitable to differentiate components $A_1$ and $A_2$ from components Ib and Ic, and system S-115, when developed for 16 hours, enabled the separation of $A_1$ from $A_2$ and Ib from Ic.

Components A and A were identified with ambutyrosins A and B*, respectively, by the physicochemical properties (TLC, IR and NMR) and antibacterial spectrum. The following descriptions are mostly confined to components Ib and Ic of antibiotic Bu-1975.

(*The antibiotic complex which was identified with ambutyrosins A and B had been isolated in our screening program and was employed as reference in the present study.)

TABLE I

TLC of Bu-1975 Components

| System | Plate | Solvent System | Rf | | | |
|---|---|---|---|---|---|---|
| | | | $A_1$ | $A_2$ | Ib | Ic |
| S-110* | silica gel | $CHCl_3$-MeOH-28%$NH_4OH$-$H_2O$ (1:4:2:1) | 0.41 | 0.41 | 0.51 | 0.51 |
| S-117 | silica gel | $CHCl_3$-MeOH-28%$NH_4OH$ (1:3:2) | 0.20 | 0.20 | 0.26 | 0.26 |
| S-115** | alumina | $CHCl_3$-MeOH-28%$NH_4OH$ (2:1:1) | 3.7$^{cm}$ | 0.2$^{cm}$ | 5.3$^{cm}$ | 0.5$^{cm}$ |

*Three times development.
**16 hours development, location is shown in cm from the origin.

Physico-chemical Properties of Components Ib and Ic

Components Ib and Ic are white amorphous solid bases, which are readily soluble in water, slightly soluble in methanol and ethanol, and practically insoluble in n-butanol, acetone and other organic solvents. Both components give positive reactions with ninhydrin and anthrone reagents but are negative in Tollens, Fehling and Sakaguchi reactions.

An analytical sample of Ib was isolated in a form of dicarbonate, which melted at about 155°C. (decomp.), $[\alpha]_D^{25} = +26.7°$ (c. 1.0, water), and analyzed as $C_{21}H_{41}N_5O_{11}\cdot 2H_2CO_3$.

Anal. calc'd.: C, 41.63; H, 6.83; N, 10.55.
Found: C, 41.52; H, 6.47; N, 10.47.

It gave tetra-N-acetate, mp. >250°C., $[\alpha]_D^{24.5} = +26.0°$ (c. 0.5, water), which analyzed as $C_{21}H_{41}N_5O_{11}(C_2H_2O)_4\cdot 3/2\ H_2O$.

Anal. calc'd.: C, 47.40; H, 7.13; N, 9.53.
Found: C, 47.30; H, 7.47; N, 9.65.

Components Ic melted at 172-178°C (decomp.), $[\alpha]_D^{25} = +30.0°$ (c-1.0, water), and analyzed as $C_{21}H_{41}N_5O_{11}\cdot 2H_2CO_3$.

Anal. Calc'd: C, 41.63; H, 6.83, N, 10.55.
Found: C, 41.22, H, 6.67, N, 10.82

The tetra-N-acetate of Ic was also prepared, mp >250°C, $[\alpha]_D^{25} = +43°$ (c 0.5, water), and analyzed as $C_{21}H_{41}N_5O_{11}\cdot(C_2H_2O)_4\cdot H_2O$.

Anal. Calc'd: C, 47.99, H, 7.08, N, 9.65
Found: C, 48.09, H 7.20, N, 9.42.

Antibiotics Ib and Ic show end absorption only in the ultra violet region. The infrared (IR) spectra of Ib and Ic are quite similar to those of ambutyrosin A and B. The nuclear magnetic spectrum (NMR) of Ib shows two anomeric protons at $\delta 5.28$ (s) and 6.10 (d,J=3.5Hz) ppm, the lower-field signal being different from that in the NMR spectrum of Ic which shows the anomeric protons at $\delta 5.28$ (s) and 5.98 (d,J=3.5Hz) ppm. Similar difference in the chemical shift of the second anomeric protons has been seen in the NMR spectra of ambutyrosin A and B. The comparative NMR data of Ib and Ic along with ambutyrosin A and B are shown in Table 5. It is also shown in the Table that the ratio of integral protons at the higher ($\delta 1.2$–2.4 ppm) and the lower ($\delta 2.5$–4.4 ppm) methylenemethine regions is 6:18 for Ib and Ic in contrast to the ratio of 4:19 for ambutyrosin A and B.

tion broth (200 flasks, 17L) was filtered and absorbed by a column of Amberlite IRC-50 ($NH_4$+form, 500 ml.). The column was washed with water and then eluted by 2.2 L of 1N $NH_4OH$ solution. The active eluates were combined, concentrated in vacuo and extracted with n-butanol. Evaporation of the butanol extract gave 1.3 g. of crude solid (component B). The aqueous layer was concentrated in vacuo to about 30 ml. which was applied on a column of Amberlite CG-50 ($NH_4$+form). The column was washed with 500 ml. of N/10 $NH_4OH$ and 700 ml. of N/4 $NH_4OH$ successively, and the bioactivity was eluated by $N/2NH_4OH$ solution. The eluate was collected fractionally and traced by bioassay, ninhydrin reaction and TLC. The active components were eluted in the order of $A_2$, $A_1$, Ib and Ic.

| Tube Nos. | Volume | TLC | Estimated Ratio | Solid |
|---|---|---|---|---|
| 69-87 | 200 ml. | $A_2 + A_1$ | 4 : 6 | 228 mg. |
| 88-111 | 250 | $A_1 + Ic$ | 3 : 7 | 193 |
| 112-159 | 500 | Ib | — | 201 |

Repeated column chromatography (CG-50, $NH_4^+$ form) of the second and third solids gave pure preparations of 120 mg. of Ic and 180 mg. of Ib, respectively.

EXAMPLE 2

B. circulans strain C532-B2-H48, which was obtained by the monospore isolation technique from the parent strain of C532-B2, was tested, Similar shake flask fermentation as in Example 1 gave a maximum potency at fifth day (pH 9.3), showing 30 mm. inhibition zone on B. subtilis PCI 219 plate and 21 mm. zone on K. pneumoniae A20680 plate. The assay value indicated that the broth contained about 150 mcg./ml. of component A and about 100 mcg./ml. of components Ib and Ic.

TABLE 2

Comparative Nuclear Magnetic Resonance (NMR) data of Components Ib and Ic with Ambutyrosins A and B
(60 MHz, in $D_2O$ pH 2.0)

| Chemical Shift ($\delta$, ppm) | Number of Protons and Type of Signals | | | |
|---|---|---|---|---|
| | Ib | Ic | Ambutyrosin A | Ambutyrosin B |
| 1.2–2.4 | 6H (m) | 6H (m) | 4H (m) | 4H (m) |
| 2.5–4.4 | 18H (m) | 18H (m) | 19H (m) | 19H (m) |
| 5.16 | — | — | 1H (s) | 1H (s) |
| 5.28 | 1H (s) | 1H (s) | — | — |
| 5.98 | — | 1H(d,J=3.5Hz) | — | 1H(d,J=3.6Hz) |
| 6.10 | 1H(d,J=3.5Hz) | — | 1H(d,J=3.6Hz) | — |

Examples of the Preparation and Purification of 4'-deoxyambutyrosin A

EXAMPLE 1

Agar slant culture of B. circulans strain C532-B2 was used to inoculate 100 ml. of medium No. YGP-1 (1.5% glucose, 0.5% polypeptone, 0.2% yeast extract, 0.05% $K_2HPO_4$ and 0.05% $MgSO_4\ 7H_2O$) in a 500 ml. Erlenmeyer flask. The seed culture was incubated at 37°C. for 24 hours on rotary shaker (250 rpm) and each 2 ml. of the growth was transferred to 100 ml. of fermentation medium No. 132 (3% soybean meal, 2% corn starch, 1% $CaCO_3$ and 0.33% $MgSo_4\cdot 7H_2O$). After six days' shaking culture at 28°C., the paper disc (8 mm.) assay of the fermentation broth showed 25 mm. inhibition zone on B. subtilis PCI219 plate and 16 mm. zone on K. pneumoniae A20680 plate. Combined fermenta-

EXAMPLE 3

B. circulans strain C308-B4 was used as a seed culture and shake flask fermentation was conducted as in Example 1. The harvested broth (18 L) contained 75 mg. of component A ($A_1 + A_2$), 6.4 g of component B and 75 mg. of components Ib and Ic.

EXAMPLE 4

B. circulans strain C436-B1 was used as a seed culture and shake flask fermentation was conducted as in Example 1. The harvested broth (20 L) contained 71 mg. of component A ($A_1 + A_2$), 4.1 g. of component B and 66 mg. of components Ib and Ic.

EXAMPLE 5

Submerged and aerated fermentation experiment was carried out in 20-L jar fermentors. B. circulans strain C532-B2-H48 was used to inoculate 10 L of medium No. YGP-1 (pH 7.2 after sterilization). The seed culture was stirred at 250 rpm at 35°C. with aeration rate of 10 L/min., and gave vigorous growth after 11 hours (pH 6.0). At 11.5 hours, 1 L of the seed culture was transferred to 10 L of sterilized production medium No. 132. The fermentation was carried out at 28°C. with aeration rate of 11.5 L/min. Frequent additions of silicone antifoam (KM-70) were necessary to control the excessive foaming. A peak potency of the broth was attained at 70 hours (pH 8.2), and the differential assay using B. subtilis PCI 219 and K. pneumoniae A20680 showed 79 mcg./ml. of component A ($A_1 + A_2$) and 49 mcg./ml. of components Ib and Ic.

EXAMPLE 6

Larger scale fermentation was carried out in pilot plant tanks capable of fermenting 100 L and 300 L volumes. The fermentation conditions were similar to those of Example 5 except that the agitation rate was 180 rpm and the incubation temperature (pH 8.7), the broth potency reached 95 mcg./ml. of component A and 45 mcg./ml. of components Ib and Ic.

EXAMPLE 7

Harvested broth from two 300-L tanks (650 L) containing about 20 mcg./ml. of component C was filtered at pH 8.5 and stirred with 8.6 L of Amberlite IRC-50 ($NH_4$ + form). The resin was separated, washed with 80 L of water and then eluted batchwise with 1 N $NH_4OH$ solution (10 L × 3). The eluates were combined and concentrated in vacuo at 35°–40°C. to about 500 ml. volume which contained 11.3 gram unit of component A and 7.3 gram unit of components Ib and Ic. The concentrate was extracted with n-butanol to remove contaminated component B, and the aqueous layer was stirred with 200 ml. of Amberlite CG-50 ($NH_4$ + form). The resin was separated, washed with 5 L of water and then placed on a top of CG-50 column ($NH_4$ + form, 1500 ml.). The column was developed with 7 L of N/4 $NH_4OH$. The activity was eluted with N/2 $NH_4OH$ and the eluates were collected fractionally, yielding 7.2 g. of component A from tube Nos. 491–800 and 4.2 g. of component Ia and Ib from tube Nos. 931–1370. A mixture of components A and Ib and Ic, 1.8 g., was recovered from tube Nos. 801–930.

Amberlite IRC 50 is the tradename for a weakly acidic cationic exchange resin of a carboxylic-polymethacrylic type.

Amberlite CG 50 is the tradename for the chromatographic grade of a weakly acidic cationic exchange resin of a carboxylic-polymethacrylic type.

The compounds V are valuable as antibacterial agents, nutritional supplements in animal feeds, therapeutic agents in poultry and animals, including man, and are especially valuable in the treatment of infectious diseases caused by Gram-positive and Gram-negative bacteria.

The compounds V when administered orally are useful as an adjunctive treatment for preoperative sterilization of the bowel. Both aerobic and anaerobic flora which are suseptible to these drugs are reduced in the large intestine. When accompanied by adequate mechanical cleansing, they are useful in preparing for colonic surgery.

The compounds V are effective in the treatment of systemic bacterial infections when administered parenterally in the dosage range of about 250 mg. to about 3,000 mg. per day in divided doses three or four times a day. Generally the compounds are effective when administered at a dosage of about 5.0 to 7.5 mg./kg. of body weight every 12 hours. Tables 3 and 4 illustrate the comparative in vitro antimicrobial activities of compound Va and Vb as compared to ambutyrosin A (Ia) and 4'-deoxyambutyrosin A (Ib) against a variety of gram-positive and gram-negative bacteria.

The MIC's are obtained by the Steers agardilution method on nutrient agar medium and are reported in mcg./ml.

Table 3

| | | | | MIC (mcg./ml.) | |
|---|---|---|---|---|---|
| | | | | Va (lot 1) | Ia |
| E. Coli | NIHJ | | | 0.8 | 0.8 |
| do. | Juhl | | A15119 | 0.8 | 0.8 |
| do. | | | A15169 | 0.8 | 0.8 |
| do. | | KM-R | A20363 | 0.8 | 0.8 |
| do. | | | A9844 | 0.8 | 0.4 |
| do. | | KM-R | A20365 | 0.4 | 0.2 |
| do. | K-12 | | A9632 | 0.8 | 0.4 |
| do. | do. | KM-R | A20664 | 1.6 | 1.6 |
| do. | do. | KM-R | A20665 | 0.4 | 0.4 |
| do. | W677 | | A20684 | 0.8 | 0.8 |
| do. | JR/W677 | | A20683 | 25 | 50 |
| K. pneumoniae | D-11 | | | 0.2 | 0.1 |
| do. | Type 22 No. 3038 | | A20680 | 25 | 100 |
| S. marcescens | | | A20019 | 1.6 | 3.1 |
| P. aeruginosa | D-15 | | | 1.6 | 3.1 |
| do. H9 | D-113 | KM-R | | >100 | >100 |
| do. | | | A9923 | 3.1 | 12.5 |
| do. | | | A9930 | 0.4 | 0.8 |
| do. | | | A15150 | 3.1 | 12.5 |
| do. | | | A15194 | 3.1 | 6.3 |
| do. | GM-R | | A20717 | 12.5 | 25 |
| do. | GM-R | | A20718 | 6.3 | 12.5 |
| P. vulgaris | | | A9436 | 0.4 | 0.4 |
| do. | | | A9526 | 0.8 | 0.8 |
| P. mirabilis | | | A9554 | 1.6 | 0.8 |
| do. | | | A9900 | 1.6 | 0.8 |
| P. morganii | | | A9553 | 1.6 | 0.8 |
| do. | | | A20031 | 1.6 | 0.8 |
| S. aureus | Smith | | A15167 | 0.4 | 0.8 |
| do. | 209P | SM-R | | 3.1 | 1.6 |
| do. | | KM-R | A20239 | 1.6 | 6.3 |
| Mycobacterium | 607 | | | 1.6 | 0.4 |
| do. | do. | KM-R | | >100 | >100 |
| do. | do. | KM,SM-R | | >100 | >100 |
| do. | phlei | | | 0.8 | 0.2 |
| do. | ranae | | | 1.6 | 0.4 |

Table 3 shows the MIC values of Va (lot 1) and Ia against 36 strains of test organisms. Table 4 shows the MIC values of Va (lot 2) and Vb against 67 strains of test organisms including 34 *Pseudomonas* strains. The last two columns of table 4 indicates the MIC ratios of Va (lot 2) to Ia and of Vb to Ib.

Compound Va (lot 2) is generally 2- to 4-fold more active than Ia against most of *Psuedomonas* species tested, 16-fold more active against a strain of *Providencia* sp. A 20894 and also 4-fold more active against *E. coli* A 20685 and *K. pneumoniae* A 20680 (the $R_B$ type resistant organisms producing neomycin phosphotransferase II) which are resistant to ambutyrosin A (Ia).

Compound Vb is almost as active as Ib against most of the test organisms (the MIC ratios are ½ – 2) except against *Ps. aeruginosa* A 20653 which is moderately resistant to Vb (MIC 25 mcg/ml) and highly resistant to Ib (>100 mcg/ml) and also against *Providencia* sp. A 20894 which is 4-fold more sensitive to Vb (6.3 mcg/ml) than IB (25 mcg/ml).

The term "(lower)" as used herein, for example, in "(lower)" alkyl or "(lower)"alkoxy is meant to define a saturated straight or branched chain carbon residue of 1 to 6 carbon atoms, e.g., methyl, ethyl, isopropyl, ethoxy, methoxy, isopropoxy, etc.

Examples of the Preferred Embodiments

EXAMPLE 1

Preparation of Tetra-N-benzyloxycarbonylambutyrosin A (IIa)

Benzyloxycarbonylchloride (1.5 g, 8.8 m moles) was added dropwise at 10° to a stirred mixture of 1.03 g (2 m moles) of ambutyrosin A (Ia) and 466 mg (4.4 m moles) of $Na_2CO_3$ in 25 ml of 20% aqueous acetone. The mixture was stirred overnight at room temperature and then concentrated in vacuo to ca 10 ml. The resulting aqueous solution was extracted with three 20-ml portions of water saturated butanol. The butanol extracts were evaporated in vacuo to give an oil, which was triturated with either, filtered and dried in vacuo to yield 1.667 g (80%) of IIa.

EXAMPLE 2

Preparation of Tetra-N-benzyloxycarbonyl-5″-O-tosylambutyrosin A (IIIa)

Tosyl chloride (314 mg, 1.66 m moles) was added at −10°C to a stirred solution of 1.65 g (1.57 m moles) of IIa in 10 ml of dry pyridine and the mixture was stirred overnight at 4°C. The reaction mixture was treated a small amount of water and evaporated to remove the pyridine. The residue was dissolved in with a small amount of a mixture of $CHCl_3$—MeOH (20:1) and chromatographed on a silica gel column (18 × 620 mm) using the above mixed solvent as an eluent. After 150 ml of the eluate had been collected the desired product was eluted in the next 77-ml fraction. Evaporation gave 743 mg (39%) of IIIa.

EXAMPLE 3

Preparation of 5″-Amino-5″-deoxyambutyrosin A (Va, BB-K126).

To a mixture of 662 mg (0.548 mmole) of IIIa in 20 ml of dimethylformamide (DMF) was added a solution of 260 mg (4 m moles) of $NaN_3$ in 1 ml of water and the mixture was heated overnight at 105°C and evaporated to dryness under reduced pressure. The residue was washed thoroughly with ether and then water to give 675 mg of crude 5″-azido-tetra-N-benzyloxycarbonyl-5″-deoxyambutyrosin A (IVa) showing an azide bond at 2120 $cm^{-1}$ in the infrared spectrum (IR), which was dissolved in 50 ml of 50% aqueous ethanol. The solution was hydrogenated overnight with 400 mg of 10% palladium on carbon under atmospheric pressure at room temperature. The catalyst was filtered off and the filtrate was evaporated in vacuo to remove the organic solvent. The resulting aqueous solution was placed on the top of a column of Amberlite of CG-50 ($NH_4^+$, 23 ml) resin, which was washed with 40 ml of water and eluted successively with 280 ml of 0.1 N $NH_4OH$, 750 ml of 0.3 N $NH_4OH$ and finally 1 L of 0.5 N $NH_4OH$. The eluate was collected in 15-ml fractions. Fractions 87 – 112 which showed a ninhydrin positive and bioactive spot at Rf 0.18 by thin layer chromatography (TLC) (silica gel plate, S-110), were combined and evaporated in vacuo and lyophilized to give 157 mg (52% from IIIa) of Va [BB-K 126 (lot 2)]; mp 168 - 170°; γC=O 1640 $cm^{-1}$.

Anal. Calcd. for $C_{21}H_{42}H_6O_{11}\cdot 3/2H_2CO_3\cdot H_2O$: C, 41.73; H, 6.97; N, 12.98.

Found: C, 41.71; H, 6.85; N, 12.75.

Amberlite CG-50 is the tradename for the chromatographic grade of a weakly acidic cationic exchange resin of a carboxylic-polymethacrylic type.

Thin layer chromatography system S-110 consists of silica gel, $CHCl_3$: MeOH: 28% $NH_4OH$: $H_2O$ in a ratio of 1:4:2:1.

EXAMPLE 4

Preparation of Tetra-N-benzyloxycarbonyl-4′-deoxyambutyrosin A (IIb)

Benzyloxycarbonyl chloride (1.5 g, 8.8 m moles) was added at 10°C to a stirred mixture of 1.0 g (2 m moles) of 4′-deoxyambutyrosin A (Ib) and 466 mg (4.4 m moles) of $Na_2CO_3$ in 25 ml of 20% aqueous acetone and the mixture was stirred at room temperature overnight. The reaction mixture was concentrated to about 10 ml and the concentrate was extracted several times with n-butanol. The extracts were evaporated to dryness to give the oily residue, which was triturated with ether to give 1.9 g (92%) of white powder (IIb).

EXAMPLE 5

Preparation of Tetra-N-benzyloxycarbonyl-5″-tosyl-4′,5″-dideoxyambutyrosin A (IIIb).

Tosyl chloride (366 mg, 1.93 m moles) was added at −10°C to a solution of 1.9 g (1.83 m moles) of IIb in 12 ml of dry pyridine. The mixture was stirred at 4°C for 3 days, treated with a small amount of water for 1 hr. at 4°C and evaporated to remove the pyridine. The residue was washed with water, dried under reduced pressure and then dissolved in a small amount of a mixture of $CHCl_3$ and $CH_3OH$ (20:1). The solution was chromatographed on a silica gel column (18 × 70 mm) using the same solvent system. After 180 ml of the eluate had been collected, the desired product emerged in the next 120 ml. This fraction was evaporated to give 723 mg (33%) of IIIb.

EXAMPLE 6

Preparation of 5''-amino-4'-5''-dideoxyambutyrosin A (Vb, BB-K 137)

To a solution of 428 mg (0.36 m moles) of IIIb in 13 ml of DMF was added a solution of 170 mg (2.6 m moles) of $NaN_3$ in 0.7 ml of water and the mixture was heated overnight at 105°C and then concentrated to dryness in vacuo. The oily residue was thoroughly washed with ether and then water to give the 5''-azido-tetra-N-benzyloxycarbonyl-4',5''-dideoxyambutyrosin A (IVb), which was dissolved in 40 ml 50% aqueous ethanol and hydrogenated with 400 mg of 10% Pd-C under ordinary pressure at room temperature overnight. The reaction mixture was filtered and evaporated under reduced pressure. The residue was dissolved in a small amount of water and placed on the top of a column of amberlite CG-50 ($NH_4^+$, 20 ml), which was washed with 30 ml of water and irrigated successively with 240 ml of 0.1 N $NH_4OH$, 600 ml of 0.3 N $NH_4OH$ and finally 1.2 L of 0.5 N $NH_4OH$. The eluate was collected in 15-ml fractions and monitored by ninhydrin spot test, disc assay (*B. subtilis*) and TLC (silica gel plate, $CHCl_3$—$CH_3OH$-28%$NH_4OH$-$H_2O$ = 1:4:2:1). Fractions 74 – 96 which showed a ninhydrin positive and bioactive spot at Rf 0.17 by TLC were combined and evaporated under reduced pressure and lyophilized to give 102 mg (57% from 10) of Vb (BB-K 137); mp 164° – 167° $\gamma$C=O 1640 cm$^{-1}$.

Anal. Calcd. for $C_{21}H_{42}N_6O_{10}\cdot S/2H_2CO_3\cdot 1/2H_2O$: C, 40.17; H, 6.89; N, 11.96.
Found: C, 40.13; H, 6.85; N, 11.70.

EXAMPLE 7

Preparation of the Monosulfate Salt of Compounds Va or Vb

One mole of compound Va or Vb is dissolved in 1 to 3 liters of water. The solution is filtered to remove any undissolved solids. To the chilled and stirred solution is added one mole of sulfur acid dissolved in 500 ml. of water. The mixture is allowed to stir for 30 minutes, following which cold ethanol is added to the mixture till precipitation occurs. The solids are collected by filtration and are determined to be the desired monosulfate salt.

EXAMPLE 8

Preparation of the Disulfate Salt of Compound Va or Vb

Thirty-Five grams of Va or Vb are dissolved in 125 ml. of deionized water. The pH is adjusted to 7-7.5 with 50% V/V sulfuric acid.

Eight and one half grams of Darco G-60 (activated charcoal) is added and the mixture is slurried at ambient room temperature for 0.5 hour.

The carbon is removed by suitable filtration and washed with 40 ml. of water. The water wash is added to the filtrate.

The combined filtrate-wash above is adjusted to pH 2–2.6 with 50% V/V sulfuric acid. A large amount of carbon dioxide is evolved. The solution is left at house vacuum with stirring for 20 minutes to expel additional carbon dioxide.

Eight and one half grams of Darco G-60 is added to the degassed solution. The mixture is slurried for 0.5 hour at ambient room temperature. The carbon is removed by suitable filtration and washed with 35 ml. of deionized water. The water is added to the filtrate.

The combined filtrate-wash is adjusted to pH 1–1.3 with 50% V/V sulfuric acid. This solution is added with rapid stirring over a 10 minute period to 600–800 ml. of methanol (3–4 volumes of methanol). The mixture is stirred for 5 minutes at pH 1–1.3, passed through a 100 mesh screen, stirred for 2 minutes and allowed to settle for 5 minutes. Most of the supernatant is decanted. The remaining slurry is suitably filtered, washed with 200 ml. of methanol and vacuum dried at 50°C for 24 hours to yield the desired disulfate salt Va or Vb.

We claim:

1. A compound having the formula

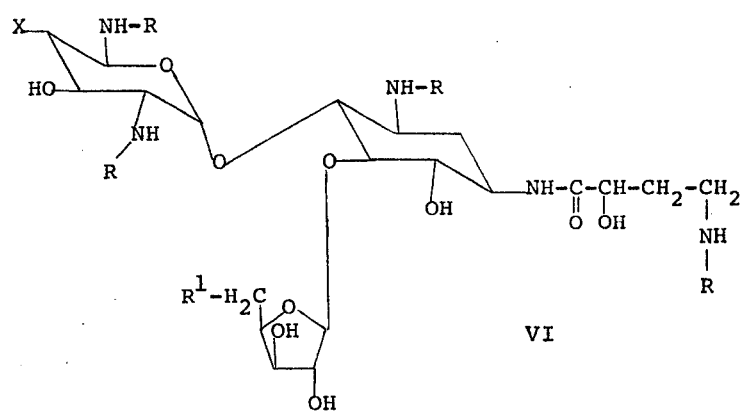

in which X is H, R is H or

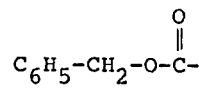

and $R^1$ is $N_3$ or $NH_2$; or a pharmaceutically acceptable acid addition salt thereof.

2. The compound of claim 1 in which R is

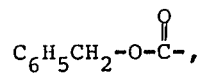

$R^1$ is $N_3$ and X is H.

3. The compound of claim 1 in which R is H, $R^1$ is $NH_2$ and X is H; or a pharmaceutically acceptable salt thereof.

4. The compound of claim 1 in which R is H, $R^1$ is $NH_2$ and X is H; or a mono-, di-, tri-, tetra- or penta sulfate salt thereof.

5. A monohydrate of the compound of claim 4.

* * * * *